US006695103B2

United States Patent
Kauhaniemi et al.

(10) Patent No.: US 6,695,103 B2
(45) Date of Patent: Feb. 24, 2004

(54) SPRING BARREL MODULE

(75) Inventors: Ilpo Kauhaniemi, Vantaa (FI); Antti Rönkkö, Espoo (FI); Matti Kosonen, Järvenpää (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/127,902

(22) Filed: Apr. 23, 2002

(65) Prior Publication Data

US 2002/0162712 A1 Nov. 7, 2002

(30) Foreign Application Priority Data

Apr. 27, 2001 (FI) .............................. 20010895

(51) Int. Cl.[7] .............................. F16D 57/02; F16F 9/00; F16F 9/52
(52) U.S. Cl. ........................ 188/291; 188/276; 267/215
(58) Field of Search ................... 188/290, 291, 188/83, 293, 276; 267/214, 215, 221, 223, 196, 205, 206, 207; 16/51, 52, 53, 75, 83, 82, 85

(56) References Cited

U.S. PATENT DOCUMENTS

| 542,840 | A | * | 7/1895 | Blount ........................... 16/53 |
|---|---|---|---|---|
| 3,160,911 | A | * | 12/1964 | Morris et al. .................. 16/52 |
| 4,550,470 | A | | 11/1985 | Omata ........................... 16/85 |
| 4,576,252 | A | | 3/1986 | Omata ........................... 185/39 |
| 4,832,155 | A | | 5/1989 | Raju ............................. 185/30 |
| 5,355,979 | A | * | 10/1994 | Stephan et al. ............. 188/290 |
| 5,529,296 | A | * | 6/1996 | Kato et al. ................... 267/215 |
| 5,862,896 | A | * | 1/1999 | Villbrandt et al. ........... 188/293 |

FOREIGN PATENT DOCUMENTS

| EP | 0684405 B1 | 7/1998 |
|---|---|---|
| EP | 1 075 125 A2 | 2/2001 |
| EP | 0 150 476 A2 | 10/2001 |
| WO | WO 97/41617 | 11/1997 |
| WO | WO 02/33255 A1 | 4/2002 |

* cited by examiner

Primary Examiner—Jack Lavinder
Assistant Examiner—Thomas J. Williams

(57) ABSTRACT

The invention concerns a spring barrel module having two chambers. A spring is located in the first chamber and a damper in the second chamber. The unidirectional damper is implemented by a clutch means that connects the damper plate to the spring shaft when the tightened spring is released, whereby the rotation of the damper slows down. Correspondingly, the clutch loosens the connection between the damper plate and the spring shaft when the spring is tightened. In low temperatures (e.g. below 0° C. degrees) the damper fails to dampen the rotation. The unidirectional feature of the damper improves both usability and durability. Breakage of the mechanical components of the spring barrel is prevented by an overload clutch, which means that the spring barrel module will tolerate even relatively rough handling of the equipment.

14 Claims, 5 Drawing Sheets

SPRING BARREL MODULE

FIELD OF THE INVENTION

The invention relates generally to the structure and operation of a spring barrel module, which is installed in a small space.

BACKGROUND OF THE INVENTION

The size of portable electronic equipment in particular is being constantly reduced. This makes great demands, e.g. on the usability and durability of the various mechanical components in the equipment.

The physical components of electronic equipment are constructed to be as simple as possible, suitable for mass production and easy to install on automated assembly lines. The components of equipment should be designed so that tolerance variations occurring in the components do not obstruct the installation or lessen the performance of the equipment.

Examples of small electronic equipment containing mechanically movable components are mobile terminals, CD stations, and CD players. The smallest mobile terminals are physically so tiny, that when the loudspeaker is held to the ear, the microphone does not reach all the way to the user's mouth without special arrangements. Mobile terminals of this kind can be enlarged with the aid of a telescope structure or with some other enlargement implementation, such as a collapsible structure. The force needed for the enlargement can be supplied by the user, or obtained from a spring or a motor, for example.

A mobile terminal that includes a body part and a grip part is described in the applicant's earlier patent application FI20001008, which has not been published by the filing date of the present application.

A relatively large portion of the body part is located within the sleeve-like grip part. The grip part is mounted for longitudinal slideable movement between a retractable position and an extended position. A spring barrel, within which a spring and a bidirectional damper are combined, is installed in the body part of the mobile terminal. When the mobile terminal is in the idle position, the body part is within the sleeve-like part, and the spring is compressed, that is, the spring is in its stressed state. When the fastening lock of the grip part and the body part is released, the stored force of the spring pushes out the body part of the mobile terminal from the grip part into the extended or operative position. The damper slows down the mechanical movement of the body part in relation to the grip part. More specifically, the mechanical movement of the body part is controlled by the bi-directional damper, which absorbs a part of the spring force to prevent the body part from jumping out suddenly and noisily into the enlarged position. After the mobile terminal has been used, the spring is reset, by the body part being pushed down manually into the grip part.

Typically there is very little space in small equipment. Valuable space is saved by a solution whereby both the spring and the damper are installed within the same housing.

However, it is a drawback in the described solution that the damper does not function in the normal manner at low or freezing temperatures (below 0° C.). This is mainly due to the behaviour of the damping oil in the damper housing. The oil solidifies and thus causes a high torque and stress to the mechanical components of the spring barrel. This results in a serious malfunction: the opening mechanism of the mobile terminal works very slowly if at all.

In addition, when the damper does not work or works very slowly, there is always the risk that the user will try to open or close the equipment by force. In the worst case such behaviour may break the mechanical components of the spring barrel.

SUMMARY OF THE INVENTION

The invention especially concerns a spring barrel module which is installed in a small space in small-sized equipment, such as a mobile terminal, and which is easy to install and economically advantageous to manufacture. It is an objective of the present invention to implement the structure of the spring barrel module so that the energy stored in the spring of the spring barrel module is adapted to convert into a linear or rotary movement, so that a certain small piece of equipment, e.g. a mobile terminal, which is designed to open, will open in a controlled manner and smoothly. It is especially important that the opening force remains as uniform as possible during the entire movement.

It is also an object of the present invention to make the manual closing operation easy and smooth for the user and in addition to protect the mechanism when the user uses force to either open or close the equipment.

This objective is achieved in the manner described in the independent claim. Advantageous embodiments of the invention are defined in the dependent claims.

The spring barrel module includes a combined spring and a damper. This solution takes less space than a separate spring and damper. The spring is preferably a clock spring. The energy stored in the spring is converted by a rotary spring shaft and then by a belt or some other such means into a linear or rotary motion. In an advantageous embodiment the damper is unidirectional, i.e. it works in one direction only. This unidirectional damper is implemented by a clutch means which connects the damper plate to the spring shaft causing slowed down rotation when the tightened spring is released. Correspondingly, the clutch loosens the connection between the damper plate and the spring shaft when the spring is tightened in order to make the manual closure easier.

Should the ambient temperature drop below a certain temperature level depending on the damping fluid used e.g. below −10° C. degrees, the damper will not dampen the rotation at all.

When the electronic equipment is closed, the spring in the spring barrel module is in its tightened state. When the spring is released, the spring force is converted by a spring shaft which is adapted to rotate by some means such as a belt into a linear or rotary motion, so that that component of the electronic equipment which is adapted to move will open in a controlled and smooth manner. When the component adapted to move is closed, e.g. by pushing it manually, the spring will reset.

Depending on the application, more than one spring barrel module can be installed in one piece of equipment. The place where the spring barrel is installed depends on how large a space there is in the equipment for installation of the spring barrel module. Another decisive factor is how long or wide a movement is desired for the component adapted to move.

The unidirectional feature of the damper improves both usability and durability. In addition, breakage of the mechanical components of the spring barrel is prevented by an overload clutch, which means that the spring barrel module will tolerate even relatively rough handling of the equipment.

An advantageous way of passing on the force obtained from the spring is by adapting the spring to rotate the spring shaft and to pass on the force by way of a toothed rack and gear to that component of the electronic equipment which is adapted to be movable.

Another advantageous way of passing on the force obtained from the spring is by adapting the spring to rotate the spring shaft and to pass on the force by way of a threaded screw to that component of the electronic equipment which is adapted to be movable.

Yet another advantageous way of passing on the force obtained from the spring is by adapting the spring to rotate the spring shaft and to pass on the force through a wheel adapted to be rotary to that component of the electronic equipment which is adapted to be movable.

BRIEF DESCRIPTION OF THE DRAWINGS

In the following, the invention will be described in greater detail in connection with advantageous embodiments and with reference to the examples shown in FIGS. 1–6 in the appended drawings, wherein.

DETAILED DESCRIPTION OF THE PREFERRED EMBODIMENT

In the following, a small spring barrel module according to the invention will be described by way of example by referring to FIGS. 1–6.

The invention will be described first by referring to FIGS. 1a–2h. In addition, FIGS. 3a–6b show some examples of how the force obtained from the spring can be passed on. It should be noted that the relative dimensions of the components shown in the figures may vary in reality.

Figure 1A:
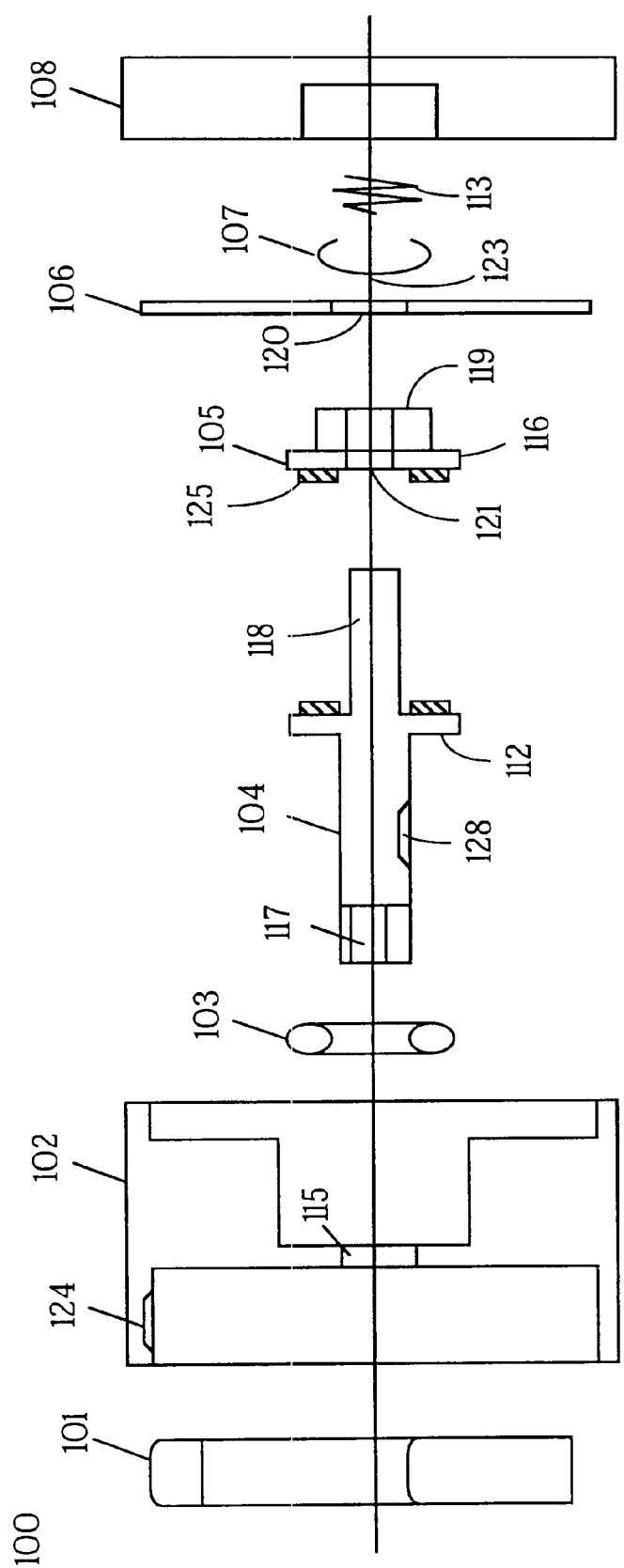
FIG. 1a is an exploded view of such components of a spring barrel module which are essential to the invention.

With the aid of an exploded view, FIG. 1a illustrates the basic structure of a spring barrel module provided with a unidirectional damper. The spring barrel module includes a spring chamber cap plate 100, a spring 101, a barrel frame 102, a seal ring 103, a spring shaft 104, a damper shaft 105, a damper plate 106, a damper leaf spring 107, a damper chamber cap plate 108, and an auxiliary spring 113.

Figure 1B:
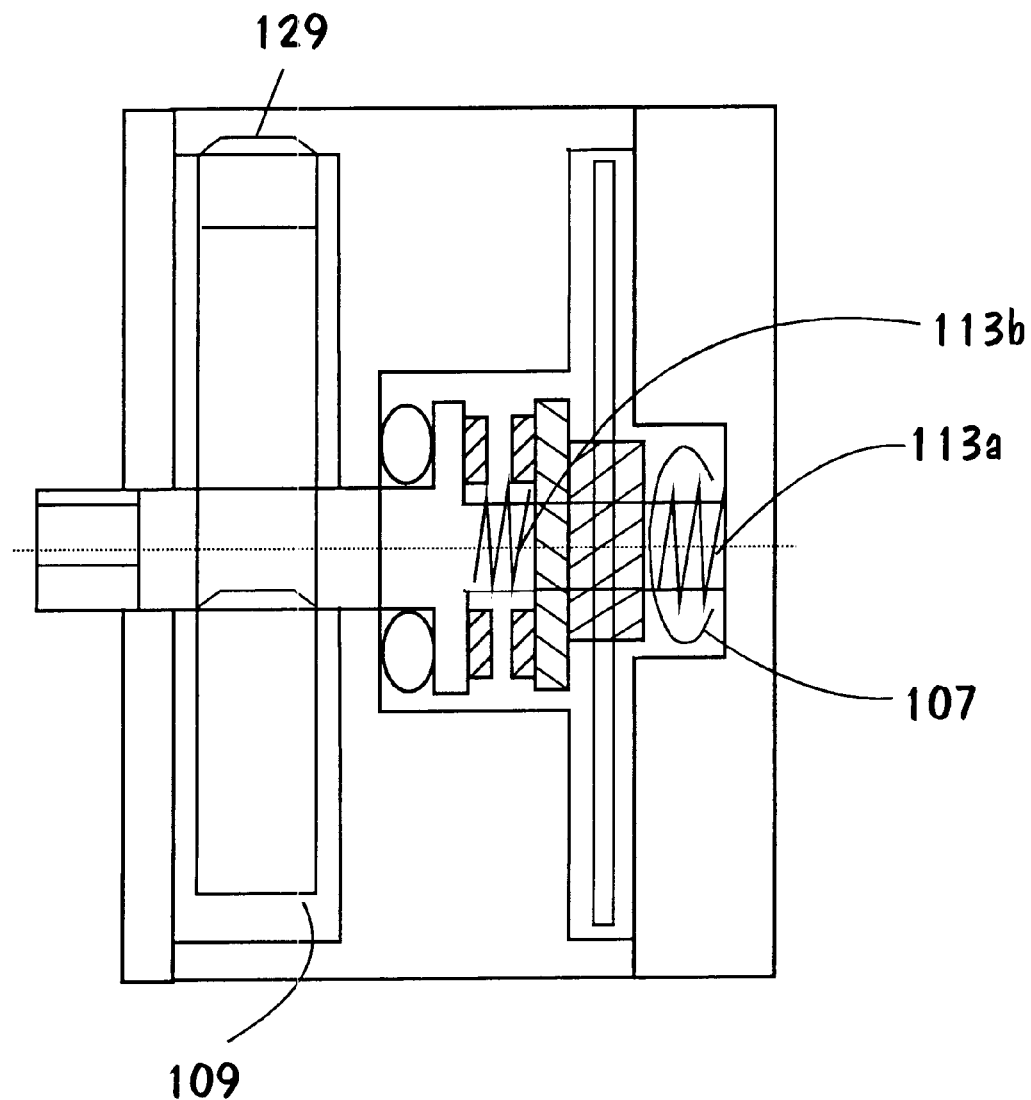
FIG. 1b shows the spring barrel module of FIG. 1a in its assembled state.

FIG. 1b illustrates the same spring barrel module in its assembled state.

From FIGS. 1a and 1b illustrate how the spring barrel module is assembled.

The spring shaft 104 is a solid piece with a circular cross-section, however, so that the cross-section of the first end of the shaft is many-sided, preferably the part fitting into the cap plate 100 hole. The cross-sectional dimension of the spring shaft varies when the shaft is viewed in the longitudinal direction from the first end 117 to the other end 118, but so that the spring shaft is symmetrical in relation to the central axis extending in the longitudinal direction. The relative axial lengths of the shaft components of different cross-sectional sizes depend on the application used.

The barrel frame 102 is shaped uniformly as a cylindrical piece without a cap and bottom. Essentially mid-way in the cylindrical piece there is a partition 114 with a circular cross-section, the diameter of which is equal to the cylinder diameter. The partition is located at right angles to the cylinder walls to form two separate open chambers: a first chamber and a second chamber.

The first end 117 of the spring shaft can be pushed at right angles through an essentially round hole 115 in the middle of the partition dividing the barrel frame into chambers. The hole diameter is so large that the spring shaft goes into the hole, but at the same time so small that a shoulder 112 located essentially in the central part of the spring shaft does not fit into the hole. Thus, this shoulder functions as a stop preventing the spring shaft from being pushed deeper. The spring shaft is thus partly on the spring chamber side and partly on the damper chamber side. A seal ring, e.g. an O-ring 103, is installed around the spring shaft in such a way that it is compressed in between the said shoulder and the partition dividing the barrel frame into chambers.

The inner end of clock spring 101 is connected mechanically to that part of the spring shaft (to the point 128 in FIG. 1a) which is located in the spring chamber. The outer end of the clock spring is attached to the inner wall (to the point 129 in FIG. 1b) in the spring chamber of the barrel frame. As is known, a clock spring is a spirally wound strip-like spring steel wire.

The damper shaft 105 is a solid piece symmetrical in relation to the central axis in the longitudinal direction of the shaft, the first end 116 of which is of a circular cross-section and the second end 119 of which is of an essentially many-sided shape, preferably square. The relative lengths of the first end and second end of the shaft in the longitudinal direction of the shaft depend on the application used. In the longitudinal direction there is a hole 121 with a circular cross-section, extending through the damper shaft. The hole is located essentially in the middle of the shaft and extends from one end to the other of the shaft. The hole diameter is a bit larger than the diameter of the second end of the spring shaft, so that the second end of the spring shaft can be pushed easily through the hole in the damper shaft. The second end of the spring shaft, which is to be pushed through the hole, is of a length slightly longer than the total length of the damper shaft.

In the cross-sectional surface of the spring shaft there is a unidirectional circular gear (as seen from the direction of the second end 118). Correspondingly, in the cross-sectional surface of the first end 116 of the damper shaft there is a further unidirectional circular gear. The circular gear surfaces of the shafts are machined in such a way that the gears fit exactly and tightly against each other, so that when the spring shaft is rotated in a clockwise direction (in this example), the toothed gear of the spring shaft will in normal use rotate with the toothed gear of the damper shaft in one rotational direction.

The damper plate 106 is of a circular cross-section and has a diameter that is smaller than the diameter of the frame barrel. The second end 119 of the damper shaft can be pushed at right angles through a hole 120 essentially of a rectangular shape and located essentially in the middle of the damper plate. The hole 120 in the damper plate is approximately of the same size as the diameter of the second end of the damper shaft, however, so that the damper shaft can be easily moved back and forth at right angles to the damper plate.

On the damper plate side opposite to the damper shaft there is a damper leaf spring 107 arranged to press the circular gears together. The second end of the spring shaft functioning as a coaxial pin extends through the hole in the damper shaft and then further extends through an essentially round hole located in the middle of the damper leaf spring.

The spring chamber cap plate 100 and the damper chamber cap plate 108 are plate-like uniform pieces of an essentially circular cross-section. They may be straight or bent into a shape, depending on the application. The cap plate of the damper chamber is a solid piece, but essentially in the middle of the spring chamber cap plate there is a circular hole 122, the diameter of which is such that the first square end of the spring shaft can be pushed at right angles through the hole.

When the spring chamber cap plate 100, the barrel frame 102, and the damper chamber cap plate 108 are attached to each other, they will together form a closed cylindrical barrel in which there are two chambers. A clock spring is located in the first chamber 109, and a damper is located in the second chamber 110 (see FIG. 1b). The length of the clock spring depends on the application, the thickness of the spring, and the size of the spring barrel module. The second chamber is filled with some known damper viscous liquid. The choice of damper liquid does not restrict the invention. The O-ring 103 prevents leakage of liquid from the central hole 115 in the barrel frame. There is no liquid in the first chamber.

The components mentioned in the foregoing may be manufactured from different metals or alloys. However, the choice of material for the components does not restrict the invention. The most important thing is that the components, which are adapted to move mechanically, are made of a sufficiently durable material.

In the following, the operation of the spring barrel module will be described in greater detail with reference to FIGS. 2a–2g. It is assumed in the following that the spring barrel module is installed in a mobile terminal of the kind described above, that is, in such a mobile terminal where the body part moves in relation to the grip part. However, these examples are not concerned with the question of how the force obtained from the spring 101 is passed on such as through the linear motion of the body part of the mobile terminal in relation to the grip part, because this is not essential from the viewpoint of the present invention.

Figure 2A:
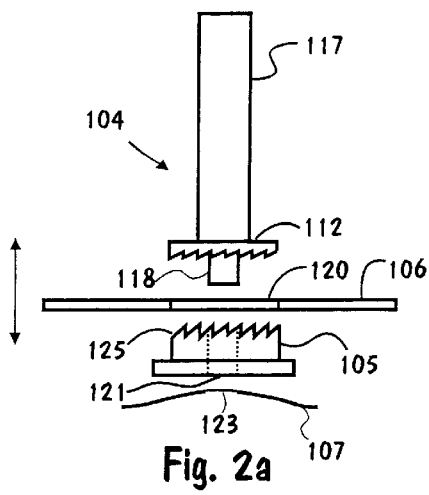
FIGS. 2a–2h illustrate some implementations and functions of the spring and damper shaft of the spring barrel module.

FIG. 2a is an exploded view of a spring and a damper shaft and of a damper plate and a leaf spring. The spring shaft 104 is preferably a uniform piece of metal, which is shaped as shown in the figure. It may be manufactured by machining or by casting in a mould. Of course, the shaft may also be made of some other durable material. At the thickest part of the spring shaft 104, opposite the before-mentioned shoulder 112, a unidirectional circular gear 112 is arranged.

Figure 2B:
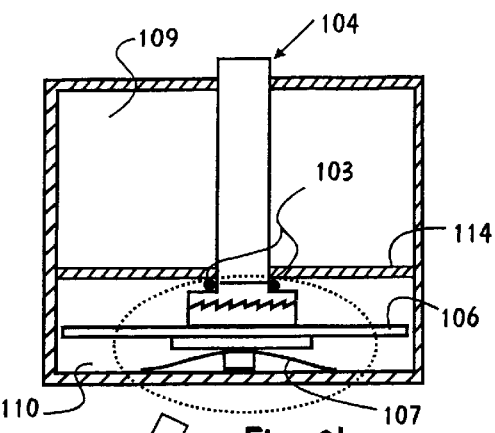
Figure 2C:
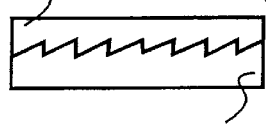
Figure 2D:
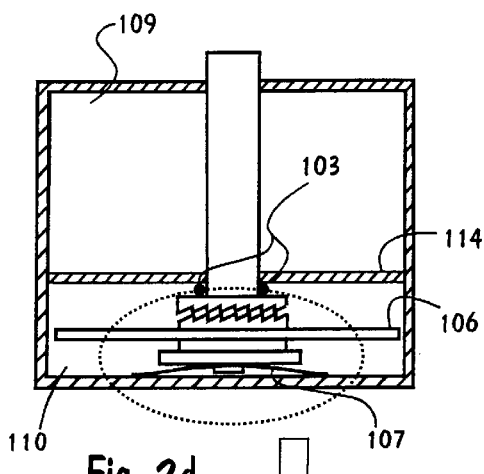
Figure 2G:
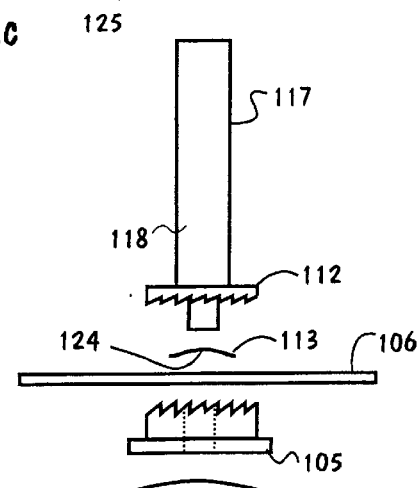
Figure 2E:
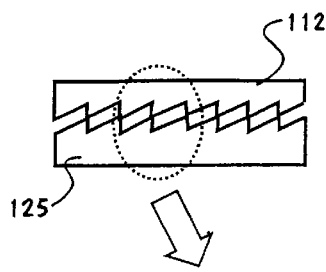
Figure 2F:
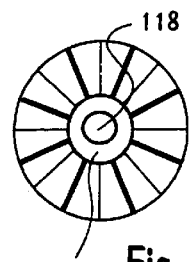

FIG. 2f illustrates the gear as seen from above. The heavier line shows the ridges of the tooth, while the thinner line shows the valleys in the tooth. In the figure, the coaxial pin 118, in the foregoing called the second end of the spring shaft 104, is located in the middle at right angles to the paper plane. A narrow groove 119 with a smooth bottom is formed between the coaxial pin and the damper shaft.

In FIG. 2a the corresponding unidirectional circular gear 125 is arranged in the cross-sectional surface of the damper shaft 105. In the middle of damper plate 106, there is a square hole 120, into which the square part of the damper shaft fits. In the middle of the damper shaft, there is a circular hole 121 smaller than the one mentioned above, through which the coaxial pin 118 of the spring shaft can be pushed. In the middle of the damper leaf spring there is a hole 123 for the coaxial pin of the spring shaft.

The damper shaft is adapted to move in the vertical direction in the figure in relation to the spring shaft 104 and the damper plate 106.

FIG. 2b illustrates the function of the spring shaft and the damper when the body part of the mobile terminal emerges into the operating position from the grip part. At first, the body part of the mobile terminal is within the sleeve-like grip part. A clock spring (not shown in the figure) is hereby tightened, that is, it is wound tightly around the spring shaft. When the locking latch between the body part and the grip part is released, the spring begins to unwind. The unwinding spring rotates the spring shaft 104 in a clockwise direction, whereby the toothed gear of the spring shaft rotates the toothed gear of the damper. The toothed gears are pushed tightly against each other by the force obtained from the leaf spring 107. FIG. 2c shows more exactly the relative positions of the toothed gears. When the toothed gear of the spring shaft rotates the toothed gear of the damper, the damper plate 106 rotates, too. Simultaneously, the body part of the mobile terminal emerges from the grip part into its operating position. The movement of the body part is smooth and controlled, because damping liquid in the damper chamber 110 softens the rotation with the help of the damper plate.

FIG. 2d illustrates the operation of the spring shaft and the damper when the body part of the mobile terminal is pushed into the grip part to its idle position. At first, the mobile terminal is in the operating position, i.e. the body part has emerged from the grip part. In this position the clock spring is not entirely stressed, but is partly unwound from around the spring shaft in the spring chamber 109 (the clock spring is not shown in FIG. 2). When the body part of the mobile terminal is pushed manually into the grip part, the spring shaft 104 rotates anti-clockwise, whereby the clock spring is wound more tightly around the spring shaft. Due to the unidirectional circular gear, the toothed gear of the spring shaft and the toothed gear of the damper shaft are being pushed away from each other, whereby the damper shaft compresses the leaf spring 107, i.e. the leaf spring is stressed. The toothed gear of the damper shaft will slow down or stop the rotation completely. This means that the force needed for closing the mobile phone to a retracted position is smaller than the force needed for opening it to an extended position. FIG. 2e illustrates the positions of the toothed gears in relation to each other.

Figure 2H:
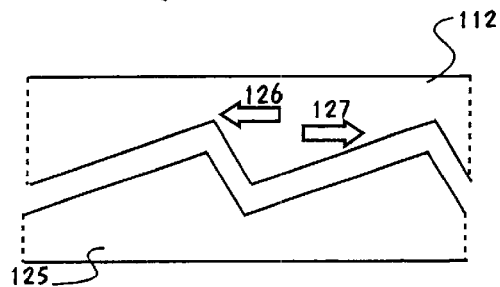

Unidirectional damping and overload protection can be performed by selecting suitable slopes for the toothed gears. As has been stated, in normal use the dampening acts in one direction only. The allowed load is defined as relatively small. When the load increases so as to exceed a predetermined amount, the overload clutch will act. FIG. 2h illustrates the teeth in more detail. An arrow 126 shows the direction of the rotation when the mobile terminal is opened in the operating position by force. The damper shaft resists rotation. An arrow 127 shows the direction of the rotation when the body part of the mobile terminal is pushed into the grip part.

When overload protection is used, the slope of the front edge of a tooth must be >90°, i.e. the more gentle the angle of the slope the easier is the overload action and vice versa.

A super elastic material may be chosen as the leaf spring material which has a sufficiently low transition temperature, e.g. −10° C. Below the transition temperature, the structural phase of the super elastic material changes and the spring loses its spring characteristics. Thus, the toothed gears of the damper shaft and spring shaft are in the position shown in FIG. 2e. When the temperature rises to the point of transition, the spring characteristics are restored.

FIG. 2g shows an exploded view of an advantageous alternative manner of implementation. The situation is otherwise similar to the one shown in FIG. 2a, but in this embodiment an auxiliary leaf spring 113 is mounted on the spring shaft side of the damper plate 106, and there is a hole 124 for the spring shaft in the middle of the leaf spring. This leaf spring is smaller and considerably weaker than the damper leaf spring. For example, its material is ordinary spring steel, which will not lose its spring characteristics at low temperatures. When leaf spring 107 loses its spring characteristics below the transition temperature, the auxiliary leaf spring 113 pushes the damper shaft into the position shown in FIG. 2d and disengages the teeth from each other. In reality, the weaker leaf spring is smaller than shown in the figure and easily fits into the groove 119 around the spring shaft (see FIG. 2f). The purpose of the arrangement shown in FIG. 2g is to make sure that no dampening takes place at predetermined low temperatures.

However, if there is no super-elastic leaf spring in use, but a normal steel leaf spring, the damper and the overload feature will still work and will protect the mechanism when the terminal is opened by the force. If a clutch is not fitted at all, the damper will still work, but only bi-directionally. Unidirectional damping means that less force is needed to close the terminal than to open it. In this way the use of the terminal is comfortable and smooth. The overload clutch acts if the user gets irritated with the slow opening of the terminal and gives a sudden pull at the body part.

The auxiliary spring 113 can be installed in two different ways: either in such a way that the auxiliary spring serves to open the clutch means, which connects the damper plate to the spring shaft, or in such a way that the auxiliary spring serves to close the said clutch means.

In the former alternative, depicted as spring 113b in FIG. 1b, instantaneous initial friction is eliminated and in the latter alternative there always exists a certain minimum friction for the damper. This is depicted with the auxiliary spring moved to the position of 113a in FIG. 2. With the help of such arrangements, the spring barrel withstands even relatively rough use. In other words, if the user tries to open or close the equipment by force, the mechanical components of the spring barrel fail to break.

The following is an examination with reference to FIGS. 3–6 of different examples of how the force obtained from the spring of the spring barrel module can be passed on to that part of the equipment which is adapted to move. It is assumed that the equipment is a mobile terminal of the kind described above.

Figure 3A:
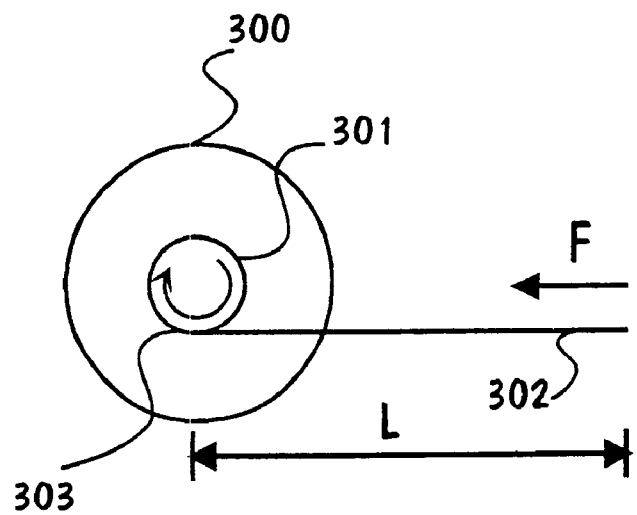
FIGS. 3a–3b illustrate how the force obtained from the spring barrel module is passed on through a wire/belt.

FIG. 3a illustrates a solution, whereby one belt or wire is used. The figure shows the spring barrel module as seen in the longitudinal direction of the spring shaft. The cylindrical spring barrel 300 is fixed. The first end of the wire/belt 302 is attached in some suitable way to that part of the spring shaft 301 which extends outside the spring barrel, in the figure to point 303. The second outer end of the wire/belt is attached to the mobile terminal. From the viewpoint of this application, it is not essential how or at which point the second end of the wire/belt is attached to the mobile terminal. The wire/belt length is L.

When the body part of the mobile terminal is located within the grip part, the clock spring is in its tightened state and the wire/belt 302 is wound at least partly around the shaft. When the locking of the body part and grip part is opened, the stored spring force of the clock spring rotates the spring shaft in the manner described earlier, whereby the wire/belt wound around the shaft will unwind at least partly from around the shaft.

Figure 3B:
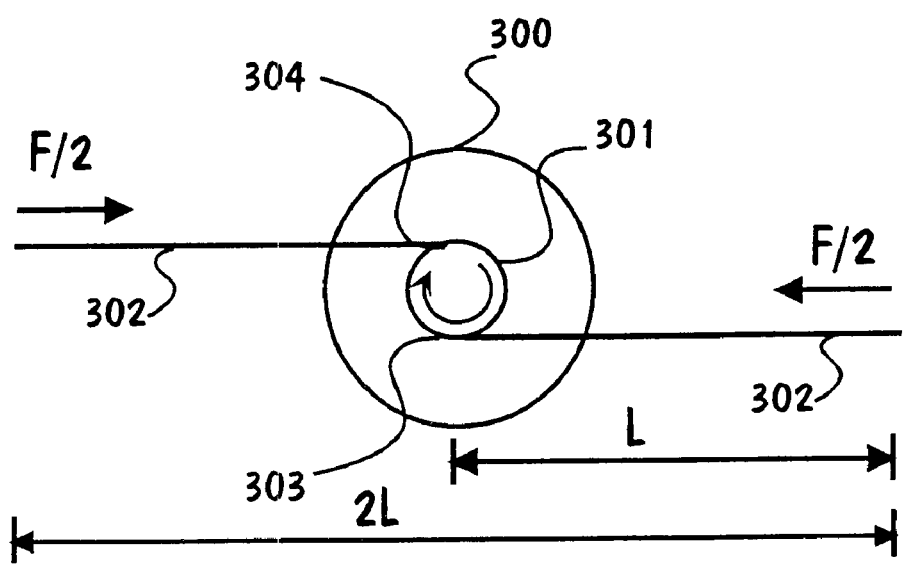

FIG. 3b illustrates a solution using two belts or wires. The first end of the belts/wires is attached to points 303 and 304 according to the figure, while the second outer end is attached in such a way to the equipment in use so that their points of attachment in the equipment are located in different directions at right angles to the spring shaft.

Otherwise, the situation is similar to that shown in FIG. 3a. In the figure, the length of one wire/belt is L, whereby the equipment opens up in its entirety for a distance 2L. The force required for opening is F/2 for one direction. This solution is especially suitable when a linear or rotary motion is needed in two different directions.

Two separate wires/belts may be attached to the spring shaft on the same plane or on different planes, or placed beside each other in relation to the longitudinal direction of the shaft.

An embodiment of this kind may be used in any kind of equipment where two opening/closing movements in different directions are required.

Figure 4A:
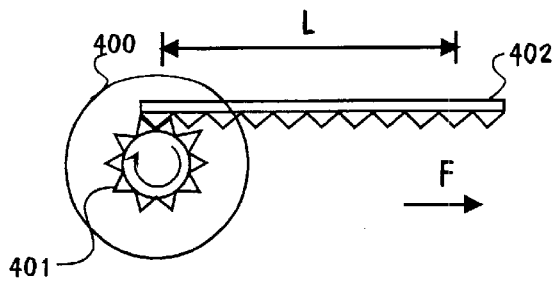
FIGS. 4a–4b illustrate how the force obtained from the spring barrel module is passed on through a toothed gear and a toothed rack.

FIG. 4a shows an embodiment, whereby the force obtained from the spring is passed on through a toothed rack 402 and a toothed gear 401 to that part of the electronic equipment which is adapted to be movable. The cylindrical spring barrel 400 is fixed. The gear is at that end of the spring shaft which emerges from the spring chamber. It is assumed, that the toothed rack is attached to the grip part of the mobile terminal while the spring barrel module is attached to the body part. When the spring shaft rotates, the gear rotates along the toothed rack, whereby the body part emerges from the grip part. When the body part is pushed manually into the grip part, the gear rotates in the opposite direction, thus rotating the spring shaft, whereby the clock spring winds around the spring shaft and is thus reset.

Figure 4B:
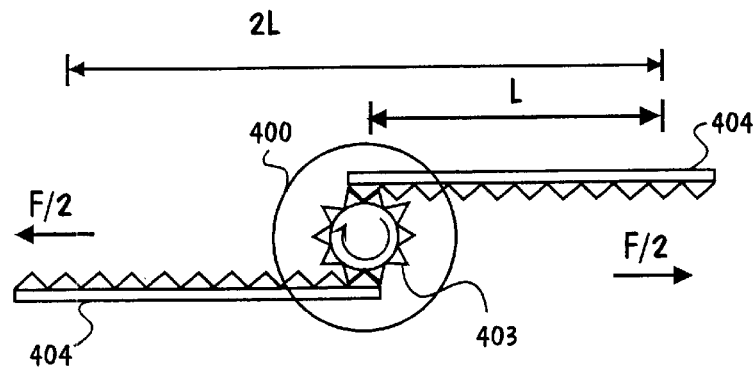

FIG. 4b illustrates an embodiment with a principle similar to the one shown in FIG. 3b. Instead of a belt/wire, a toothed gear 403 and two separate toothed racks 404 are used. The cylindrical spring barrel 400 is fixed. The shaft 403 rotates.

Figure 5:
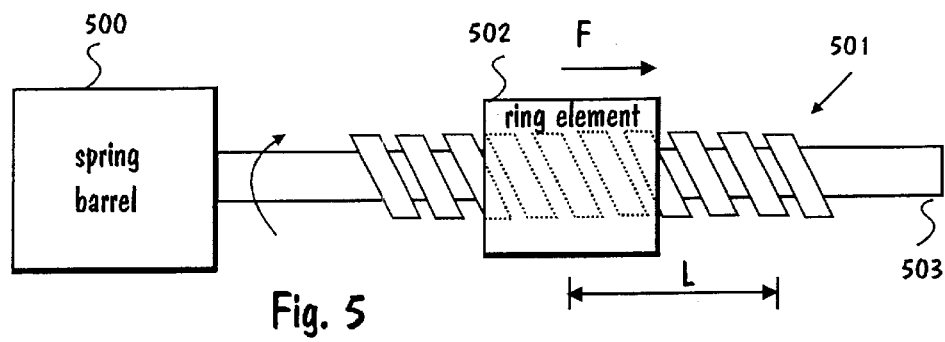
FIG. 5 illustrates how the force obtained from the spring barrel module is passed on through a threaded screw.

FIG. 5 shows an embodiment, whereby the force obtained from the spring is passed on through a threaded screw 501 to that part of the electronic equipment which is adapted to be movable.

In this embodiment, the first end 503 of the spring shaft, which extends past the cylindrical spring shaft barrel 500, is of a length which is a multiple of the axial length of the spring shaft barrel. In addition, the said shaft part is machined in such a way that there are threads on at least a portion of its outer surface. In this solution a ring element 502 is attached to that part of the equipment which is adapted to be movable, whereby the outer shape of ring element 502 is made suitable for the application. A hole extends axially through the ring element from one end to the other, with a mating thread for a threaded screw. When the spring shaft rotates, e.g. clockwise, due to the thread the ring element moves along the shaft and away from the spring barrel module, whereby that part of the equipment which is adapted to be movable will open. When that part of the equipment which is adapted to be movable is closed, e.g. when it is pushed manually, the ring element moves towards the spring barrel module, the spring shaft rotates anticlockwise, and the spring of the spring barrel module is wound around the spring shaft and reset.

Figure 6A:
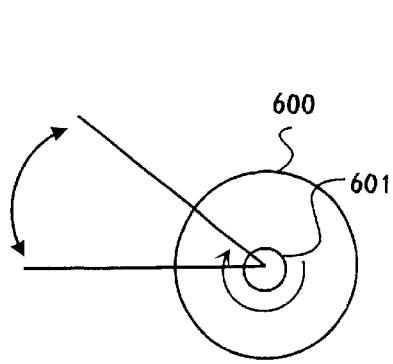
FIGS. 6a–6b are examples of limited rotation of the spring shaft.

FIG. 6a illustrates a situation, where the rotation of the spring shaft 601 is limited. In other words, the spring shaft rotates at a predetermined angle α (α<360°), for example. The cylindrical spring barrel is fixed.

Figure 6B:
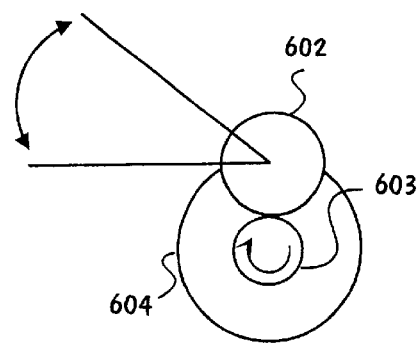

FIG. 6b shows another alternative solution where the rotary motion is limited. The spring barrel 604 is fixed. The force is transferred from the spring shaft 603 through a wheel 602 in the manner shown by the figure. In other words, the wheel 602 transmits rotation of the shaft 603 to a belt/wire (not shown in FIG. 6b), the first end of which is attached to the wheel and the second end is attached to that part of the equipment which is adapted to be movable. Of course, the solution shown in the figure may also be implemented in such a way that there is a toothed gear rack instead of a wheel, whereby there must also be a toothed gear on the shaft end.

It should be noted that the examples presented in the foregoing represent only some of the various possibilities for implementation. Persons skilled in the art will find it obvious that various other combinations can be made based on the examples presented above.

The size of the spring barrel is decisive, as is the space reserved for the spring barrel module in the equipment. For industrial production, it is important that the assembly and installation of the spring barrel are as simple and economically advantageous as possible.

Although the invention is designed to be especially suitable for small-size equipment, the invention is not limited to applications for such equipment. Naturally, the spring barrel module described may be built into equipment of any size. The structure and function of the spring barrel module are decisive.

The manner of the attachment most suitable in each case is affected, for example, by the materials chosen, by the place where the spring barrel module is installed, and by how great is the stress applied to the point of attachment. The wire/belt may be attached in many different ways: by riveting, by welding, by gluing, etc.

Of course, the spring shaft and the damper shaft can also be assembled from different parts.

It should be noted that there are many different application possibilities. Depending on each application, the spring barrel is installed in the equipment at the most suitable point. This means in practice that even in different variations of similar equipment the spring barrel may be located in different places for either technical or aesthetic reasons. In addition how many spring barrel modules are installed in the equipment depends on the application.

Although different ways of implementation have been described in the foregoing with reference to a mobile terminal, the spring barrel module may be installed in equipment of any kind requiring smooth linear or rotary motion. There are very many different applications: a disk tray of a CD/DVD stations and a computer keyboard emerging from under the tabletop are mentioned as examples.

What is claimed is:

1. A spring module comprising:
    a housing comprising a cylindrical sidewall, a first cap plate having an opening in the middle, a second cap plate, a partition between the first cap plate and the second cap plate, the partition having an opening in the middle, wherein the first cap plate, the sidewall, and the partition shape a first chamber, and the second cap plate, the sidewall, and the partition shape a second chamber,
    a spring shaft located in the first chamber, the first end of the spring shaft extending through the opening in the first cap plate and the second end of the spring shaft extending through the opening in the partition into the second chamber,
    a spring located in the first chamber, one end of the spring being fixed to the spring shaft and the other end of the spring being fixed in the cylindrical sidewall, wherein the spring is tightened by the application of an external rotating force to the first end of the spring shaft,
    a damping element comprising a damping plate and a damping shaft extending from the damping plate, the damping element located in the second chamber being filled with a viscous liquid,
    clutch means for connecting the damping element to the spring shaft when the tightened spring is released and for loosening the damping element from the spring shaft when the spring is tightened, the clutch means comprising a first toothed circular surface arranged at the head of the spring shaft located in the second chamber, a second toothed circular surface arranged at the head of the damping shaft, and a spring element between the damping plate and the second cap plate for pressing the second toothed circular surface against the first toothed circular surface, the spring element comprising at least one temperature dependent spring.

2. A spring module as claimed in claim 1, wherein the teeth of the first toothed circular surface and the teeth of the second toothed circular surface are sloped so that the toothed circular surfaces are in tight mutual connection when the tightened spring is released but the first toothed circular surface slides on the second toothed circular surface when the spring is tightened,
    wherein upon releasing the tightened spring, the damping plate rotates in the viscous liquid to dampen the rotation of the spring shaft but when the spring is tightened the damping plate is essentially disconnected from the spring shaft.

3. A spring module as claimed in claim 1, wherein the spring element consists of a leaf spring.

4. A spring module as claimed in claim 3, wherein the leaf spring is selected from a material losing its elasticity at a predetermined temperature.

5. A spring module as claimed in claim 1, wherein the clutch means further include an auxiliary spring arranged between the damping plate and the first toothed circular surface, the spring force of the auxiliary spring being less than the spring force of the spring element.

6. A spring module as claimed in claim 1, having a coaxial pin extending from the second end of the spring shaft located in the second chamber facing the second cap plate.

7. A spring module as claimed in claim 6, wherein the coaxial pin passes through openings in the damping means, thus, retaining the damping means aligned with the spring shaft.

8. A spring module as claimed in claim 1, wherein the clutch means comprises a seal ring arranged around the spring shaft in the second chamber preventing leakage of the viscous liquid to the first chamber.

9. A spring module as claimed in claim 1, wherein the spring module further comprises:
    threads machined on at least part of the first end of the outer surface of the spring shaft,
    a ring element having a mating thread on its inner surface for cooperation with the thread of the shaft and mechanically coupled to a component to be moved, wherein rotation of the spring shaft causes movement of the ring element along the shaft.

10. A spring module as claimed in claim 1, wherein the rotation of the spring shaft is limited to a predetermined angle.

11. A spring module as claimed in claim 1, having a wheel for transmitting rotation of the shaft to at least one belt.

12. A spring module as claimed in claim 1, having a wheel for transmitting rotation of the shaft to at least one wire.

13. A spring module comprising:

a housing comprising a cylindrical sidewall, a first cap plate having an opening in the middle, a second cap plate, a partition between the first cap plate and the second cap plate, the partition having an opening in the middle, wherein the first cap plate, the sidewall, and the partition shape a first chamber, and the second cap plate, the sidewall, and the partition shape a second chamber, a spring shaft located in the first chamber, the first end of the spring shaft extending through the opening in the first cap plate and the second end of the spring shaft extending through the opening in the partition into the second chamber, a spring located in the first chamber, one end of the spring being fixed to the spring shaft and the other end of the spring being fixed in the cylindrical sidewall, wherein the spring is tightened by the application of an external rotating force to the first end of the spring shaft, a damping element comprising a damping plate and a damping shaft extending from the damping plate, the damping element located in the second chamber being filled with a viscous liquid, clutch means for connecting the damping element to the spring shaft when the tightened spring is released and for loosening the damping element from the spring shaft when the spring is tightened, said clutch means comprising a first toothed circular surface arranged at the head of the spring shaft located in the second chamber, a second toothed circular surface arranged at the head of the dampening shaft, and a leaf spring selected from a material losing its elasticity at a predetermined temperature and positioned between the damping plate and the second cap plate for pressing the second toothed circular surface against the first toothed circular surface.

14. A spring module comprising:

a housing comprising a cylindrical sidewall, a first cap plate having an opening in the middle, a second cap plate, a partition between the first cap plate and the second cap plate, the partition having an opening in the middle, wherein the first cap plate, the sidewall, and the partition shape a first chamber, and the second cap plate, the sidewall, and the partition shape a second chamber, a spring shaft located in the first chamber, the first end of the spring shaft extending through the opening in the first cap plate and the second end of the spring shaft extending through the opening in the partition into the second chamber, a spring located in the first chamber, one end of the spring being fixed to the spring shaft and the other end of the spring being fixed in the cylindrical sidewall, wherein the spring is tightened by the application of an external rotating force to the first end of the spring shaft, a damping element comprising a damping plate and a damping shaft extending from the damping plate, the damping element located in the second chamber being filled with a viscous liquid, clutch means for connecting the damping element to the spring shaft when the tightened spring is released and for loosening the damping element from the spring shaft when the spring is tightened, said clutch means comprising a first toothed circular surface arranged at the head of the dampening shaft, and a spring element between the damping plate and the second cap plate for pressing the toothed circular surface against the first toothed circular surface, and an auxiliary spring arranged between the damping plate and the first toothed circular surface, the spring force of the auxiliary spring being less than the spring force of the spring element.

* * * * *